United States Patent [19]
Pearson

[11] Patent Number: 4,537,339
[45] Date of Patent: Aug. 27, 1985

[54] UMBRELLA SUPPORT

[76] Inventor: Beverly Pearson, 200 Blue Grass Dr., Richmond, Ky. 40475

[21] Appl. No.: 622,256

[22] Filed: Jun. 19, 1984

[51] Int. Cl.³ .............................................. F16M 13/00
[52] U.S. Cl. .................................... 224/188; 224/186; 248/514
[58] Field of Search ............... 224/188, 186, 149, 915, 224/189, 208, 262, 200, 242, 247, 251, 190; 248/514, 515, 517; D3/5

[56] References Cited

U.S. PATENT DOCUMENTS

| | | | |
|---|---|---|---|
| 792,126 | 6/1905 | Freund | 224/915 X |
| 877,802 | 1/1908 | Shuster | 224/200 X |
| 1,466,715 | 9/1923 | Hart | 224/247 X |
| 1,657,263 | 1/1928 | Lauby | 224/188 |
| 2,541,614 | 2/1951 | Rosenberger | 224/188 |
| 2,610,778 | 9/1952 | Young | 224/188 |
| 3,120,332 | 2/1964 | White | 224/247 X |
| 3,282,482 | 11/1966 | Scharsu | 224/208 X |
| 4,046,296 | 9/1977 | McGhee | 224/208 |

FOREIGN PATENT DOCUMENTS

| | | | |
|---|---|---|---|
| 205068 | 6/1966 | Sweden | 224/208 |
| 211395 | 9/1940 | Switzerland | 224/186 |

Primary Examiner—Stephen Marcus
Assistant Examiner—Robert Petrik
Attorney, Agent, or Firm—Frank C. Leach, Jr.

[57] ABSTRACT

An umbrella support includes a planar support having upper and lower pockets thereon to receive a curved or straight handle of a short or long umbrella shaft, respectively, of an umbrella to be supported. The support is mounted on the front or back of a user's body. When mounted on the back, the angle of the planar support to the user's body can be varied by a pivotally mounted plate at the bottom of the planar support engaging the user's body at various angles. The upper end of the planar support has guide passages to receive a portion of the umbrella shaft and retain it therein. Leather straps secure the umbrella shaft to the planar support between the upper or lower pocket in which the handle end of the shaft is supported and the passages in the guides. The upper end of the planar support has a pivotally mounted plate with slots therein to receive the umbrella shaft when the plate is in a horizontal position. In this position, the umbrella shaft cannot pass through the guide passages so that the angle of the umbrella to the planar support is different. Each of the slots in the pivotally mounted plate retains the umbrella shaft therein.

22 Claims, 7 Drawing Figures

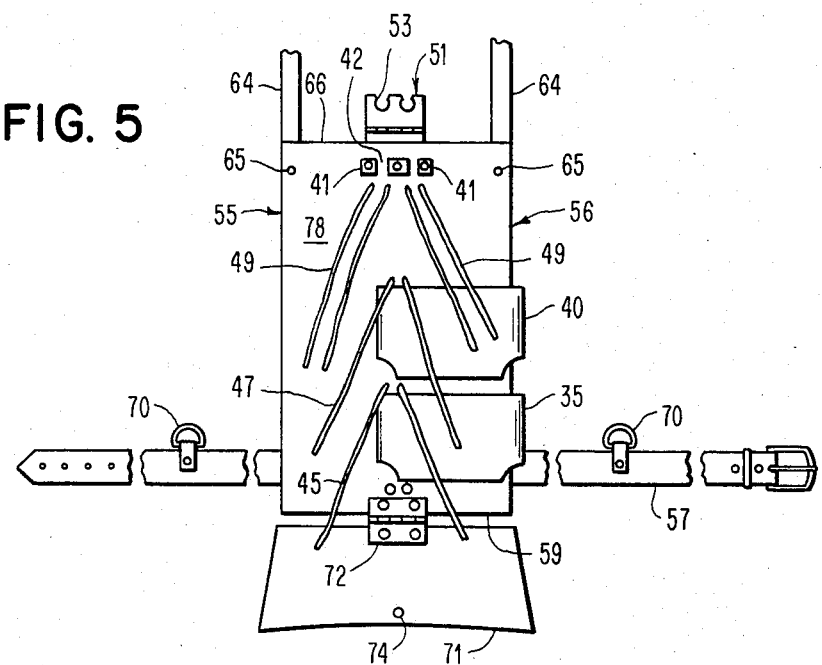
FIG. 5
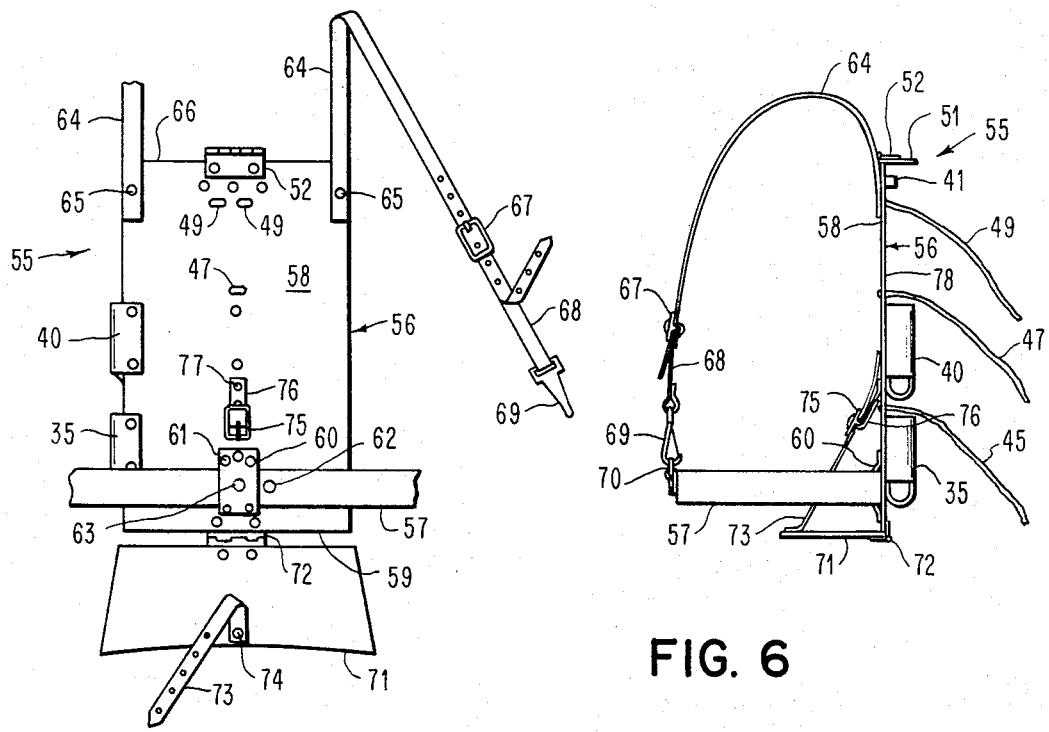
FIG. 7
FIG. 6

UMBRELLA SUPPORT

This invention relates to an umbrella support for wearing by a user and, more particularly, to a support for an umbrella in which the umbrella may be positioned at various angles relative to the user and capable of supporting umbrellas of any length shaft and with either a curved or straight handle.

An umbrella requires a user to employ at least one hand to hold the umbrella shaft by its handle. When it is necessary for both hands to be free, one cannot also hold an umbrella. When an umbrella is to be held for a long period of time, it becomes very tiresome. Thus, in each of these situations, it is desired that an umbrella not be supported by the hands of the user.

Various umbrella supports have previously been suggested in U.S. Pat. Nos. 877,802 to Shuster, 988,485 to Mitchell, 1,399,683 to Beavers, 1,704,407 to Rice, and 2,926,826 to Conrad. Each of the aforesaid patents has disadvantages that has kept it from being commercially usable.

For example, the umbrella support of each of the aforesaid Beavers and Rice patents requires modification of an umbrella shaft. Each of the aforesaid Rice and Beavers patent also cannot be employed with a curved handle umbrella.

The umbrella support of each of the Mitchell and Conrad patents cannot support an umbrella having a curved handle. Each of these umbrella supports also is limited as to the position at which the umbrella can be disposed relative to the user's body.

Only the umbrella support of the aforesaid Shuster patent is capable of supporting an umbrella shaft of varying lengths and with a curved or straight handle. However, the umbrella support of the aforesaid Shuster patent uses a complex mechanism for holding the umbrella at various desired positions. Thus, the umbrella support of the aforesaid Shuster patent is relatively expensive, complex, and relatively heavy because of the mechanism.

The umbrella support of the present invention overcomes the disadvantages of the prior umbrella supports in that no mechanism is required to support the umbrella and umbrellas of any length can be supported with either a curved or straight handle. The umbrella support of the present invention also is relatively light weight so it is not uncomfortable when worn for a relatively long period of time as can occur with the umbrella support of the aforesaid Shuster patent because of the weight of its mechanism.

Because of the use of the umbrella support during rain, the various mechanical portions of the umbrella support of the aforesaid Shuster patent could rust over a period of time. The umbrella support of the present invention avoids this through preferably being formed of leather.

An object of this invention is to provide an umbrella support for supporting an umbrella in various selected positions.

Another object of this invention is to provide an umbrella support for an umbrella irrespective of whether the umbrella has a short or long shaft and a curved or straight handle.

Other objects of this invention will be readily perceived from the following description, claims, and drawings.

This invention relates to an umbrella support for holding an umbrella at a selected position irrespective of whether the umbrella has a short or long shaft and a curved or straight handle. The umbrella support includes support means for disposition on a user's body and means to retain the support means on the user's body at a selected position. The support means has first receiving means and second receiving means mounted thereon in vertically spaced relation to each other with the first receiving means being disposed beneath the second receiving means and receiving a handle of a relatively long umbrella shaft of an umbrella to be supported thereby and the second receiving means receiving a handle of a relatively short shaft of an umbrella to be supported thereby. Each of the first receiving means and the second receiving means can receive either a curved handle or a straight handle. A plurality of shaft guide means is mounted on the support means above the second receiving means to receive a portion of the umbrella shaft having its handle supported by one of the first receiving means and the second receiving means. Each of the shaft guide means includes means to hold a portion of the umbrella shaft therein. The shaft guide means are spaced from each other in a substantially horizontal direction so that each of the shaft guide means provides a different angle to the umbrella shaft supported on the support means. The support means has securing means to secure to the support means a portion of the umbrella shaft extending from one of the first receiving means and the second receiving means.

The attached drawings illustrate preferred embodiments of the invention, in which:

FIG. 5 is a rear elevational view of a modification of the umbrella support of the present invention for wearing on the back of a user's body;

FIG. 6 is a side elevational view of the umbrella support of FIG. 5; and

FIG. 7 is a front elevational view of the umbrella support of FIG. 5.

Figure 1:
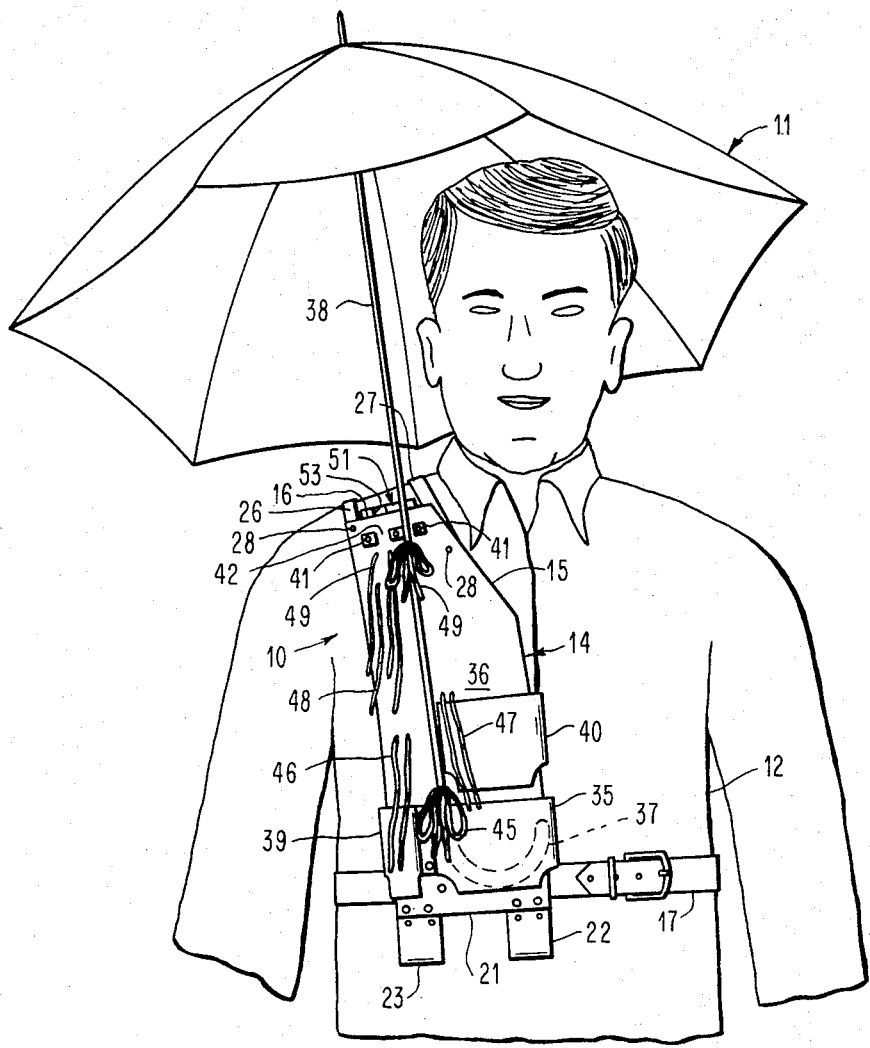
FIG. 1 is a front elevational view of an umbrella support for wearing on the front of a user's body and showing the umbrella support mounted on a user's body.

Referring to the drawings and particularly FIG. 1, there is shown an umbrella support 10 for supporting an umbrella 11 in various selected positions relative to a body 12 of a user on which the umbrella support 10 is mounted. The umbrella support 10 includes a planar support plate 14, which is preferably formed of leather having a thickness of about ¼". The support plate 14 is substantially rectangular shaped but has an inclined edge 15 adjacent its upper end 16 so as to fit close to the neck of the body 12 of the user.

The support plate 14 is retained on the body 12 of the user by a leather belt 17, which extends around the waist of the user. The belt 17 extends through a pair of leather loops 18 (see FIG. 2) and 19, which are attached by rivets 19' to a rear surface 20 of the support plate 14 adjacent its lower end 21. Each of the loops 18 and 19 is formed with an additional leather loop 22 and 23, respectively, extending beneath the lower end 21 of the support plate 14 if it is desired to have the belt 17 at a lower position on the waist of the user. This would be particularly applicable to a tall person. It should be understood that additional loops beyond the loops 22 and 23 could be employed with the loops 18 and 19, if desired.

The belt 17 is preferably secured to the loop 18 when used with the loops 18 and 19 and to the loop 22 when used with the loops 22 and 23. This is accomplished through providing a snap button 24 on each of the loops 18 and 22 and a snap receptacle (not shown) on the belt 17 for cooperating with one of the snap buttons 24.

The rear surface 20 of the support plate 14 has upper ends of a pair of leather straps 26 and 27 attached thereto by rivets 28 adjacent the upper end 16 of the support plate 14. The strap 26 has the strap 27 connected thereto through the strap 26 having a pair of snap buttons 29 thereon for cooperation with a snap receptacle (not shown) on the strap 27 adjacent the lower end of the strap 27. Thus, the strap 27 can be selectively attached to the strap 26 at two different locations depending on the positions of the snap buttons 29 on the strap 26.

The strap 26 is attached to a leather strap 31 by a buckle 32. The strap 31 is connected to the belt 17 by a hook 33 being connected to one of a pair of loops 34 on the belt 17. The use of the buckle 32 enables adjustment of the overall length of the strap 26 in accordance with the size of the user. The two loops 34 on the belt 17 enable selective positioning of the strap 31 to obtain a comfortable fit of the support plate 14 on the body 12 (see FIG. 1) of the user with the straps 26 and 27 passing over the right shoulder of the body 12 of the user.

The support plate 14 has a first lower pocket 35, which is preferably formed of leather, mounted on its front surface 36 just above the lower end 21 of the support plate 14. The width of the first lower pocket 35 is about three-fourths of the width of the support plate 14 so as to be capable of receiving a curved handle 37 on the bottom end of an umbrella shaft 38 of the umbrella 11. The depth of the first lower pocket 35 also is capable of receiving and supporting a straight handle if the shaft 38 of the umbrella 11 has such.

However, if desired, a second lower pocket 39 may be mounted on the front surface 36 of the support plate 14 and in the same horizontal plane as the first lower pocket 35. The second lower pocket 39 would be used solely to receive and support a straight handle on the end of the shaft 38 of the umbrella 11.

The front surface 36 of the support plate 14 has an upper pocket 40, which is preferably formed of leather, disposed above the first lower pocket 35 and in vertically spaced relation thereto. The upper pocket 40, which has substantially the same width as the first lower pocket 35, can receive the curved handle 37 on the end of the umbrella shaft 38 of the umbrella 11 when the shaft 38 is relatively short. These short shafts are employed with folding type umbrellas. The depth of the upper pocket 40 also is capable of receiving and supporting a straight handle on the end of the shaft 38 of the umbrella 11 when the shaft 38 is relatively short.

The front surface 36 of the support plate 14 has a plurality of guide blocks 41 mounted adjacent the upper end 16 of the support plate 14 and spaced from each other in a substantially horizontal direction to form guide passages 42 therebetween to receive a portion of the umbrella shaft 38 after the curved handle 37 has been disposed in one of the pockets 35 or 40 or a straight handle on the end of the shaft 38 has been disposed in one of the pockets 35, 39, and 40.

Figure 4:
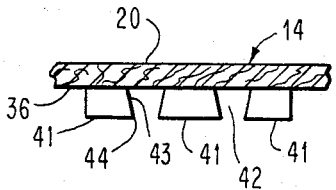
FIG. 4 is an enlarged top plan view, partly in section, of a portion of the umbrella support of FIG. 1.

Each of the guide blocks 41 has its side surface 43 (see FIG. 4), which forms a wall of one of the guide passages 42, inclined inwardly from its outer end 44 to the front surface 36 of the support plate 14. Thus, the entry of a portion of the umbrella shaft 38 (see FIG. 1) into one of the guide passages 42 must be forced therein so that the umbrella shaft 38 is retained or held therein because of the spacing at the outer end of each of the guide passages 42 being less than the size of the portion of the umbrella shaft 38 disposed in the guide passage 42.

The support plate 14 has a leather strip 45 disposed above the first lower pocket 35 for wrapping around the umbrella shaft 38 to secure the umbrella shaft 38 to the support plate 14 as shown in FIG. 1. The support plate 14 has a leather strip 46 disposed above the second lower pocket 39 for wrapping around the umbrella shaft 38 to secure the umbrella shaft 38 to the support plate 14 when the umbrella shaft 38 has a straight handle disposed in the second lower pocket 39.

The support plate 14 has a leather strip 47 disposed above the upper pocket 40 for wrapping around the umbrella shaft 38 to secure the umbrella shaft 38 to the support plate 14 when the curved handle 37 of the umbrella shaft 38 is disposed within the upper pocket 40. The support plate 14 has a leather strip 48 disposed for wrapping around the umbrella shaft 38 when the handle 37 of the umbrella 11 is disposed in one of the first lower pocket 35 and the second lower pocket 39 and extends through the outer guide passage 42 to further secure the umbrella shaft 38 to the support plate 14.

The support plate 14 has a leather strip 49 disposed beneath each of the guide passages 42 to secure the umbrella shaft 38 to the support plate 14 when the umbrella shaft 38 passes through the guide passage 42 disposed above the leather strip 49. Thus, the umbrella shaft 38 is secured at least twice and possibly three times to the support plate 14 between the pocket 35, 39, or 40 in which it is disposed and the guide passages 42. Each of the leather strips 45-49 extends through a pair of holes in the support plate 14. The holes in the support plate 14 enable each of the leather strips 45-49 to be a single strip.

The upper end 16 of the support plate 14 has a shaft support plate 51 (see FIG. 2), which is preferably formed of leather, pivotally connected thereto by a hinge 52. The shaft support plate 51 is movable about the hinge 52 so that the shaft support plate 51 can be disposed substantially perpendicular to the support plate 14 as shown in FIGS. 1 and 3. In this position, one of two slots 53 (see FIG. 2) in the shaft support plate 51 receives a portion of the umbrella shaft 38 (see FIG. 1). Each of the slots 53 (see FIG. 2) is smaller at its outer end than its inner end to retain or hold the disposed umbrella shaft 38 (see FIG. 1) therein.

As shown in FIG. 3, the shaft engaging position of the shaft support plate 51 causes the umbrella shaft 38 to extend at an angle away from the support plate 14 and prevents the umbrella shaft 38 from passing through any of the guide passages 42 (see FIG. 1). Thus, the shaft engaging position of the shaft support plate 51 provides a new angular relation of the umbrella shaft 38 to the support plate 14 and the body 12 of the user.

Figure 2:
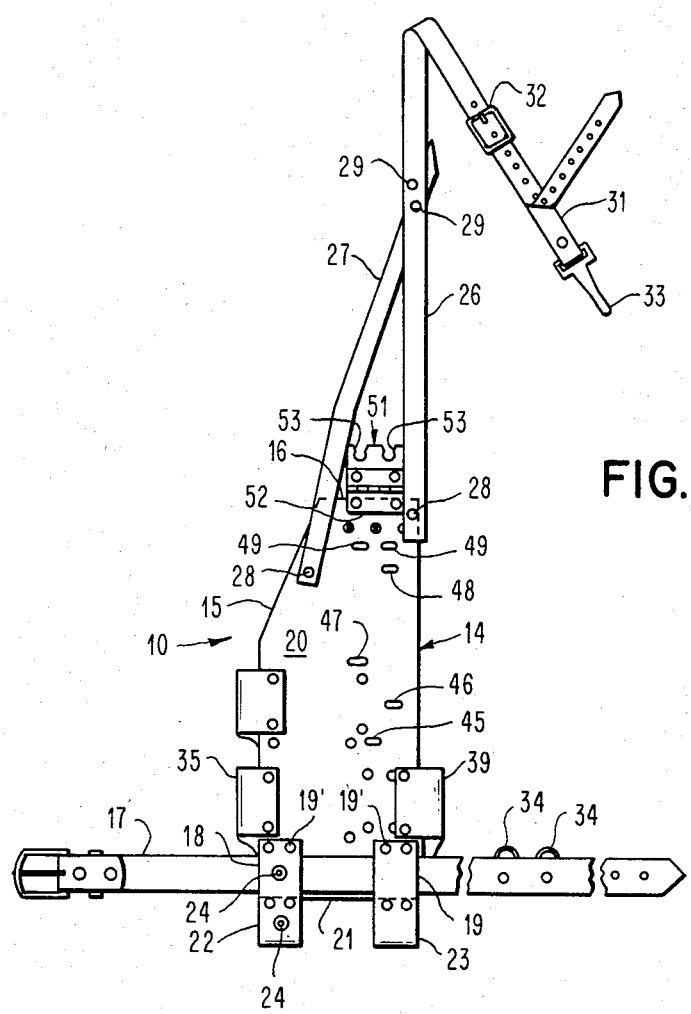
FIG. 2 is a rear elevational view of the umbrella support of FIG. 1.
Figure 3:
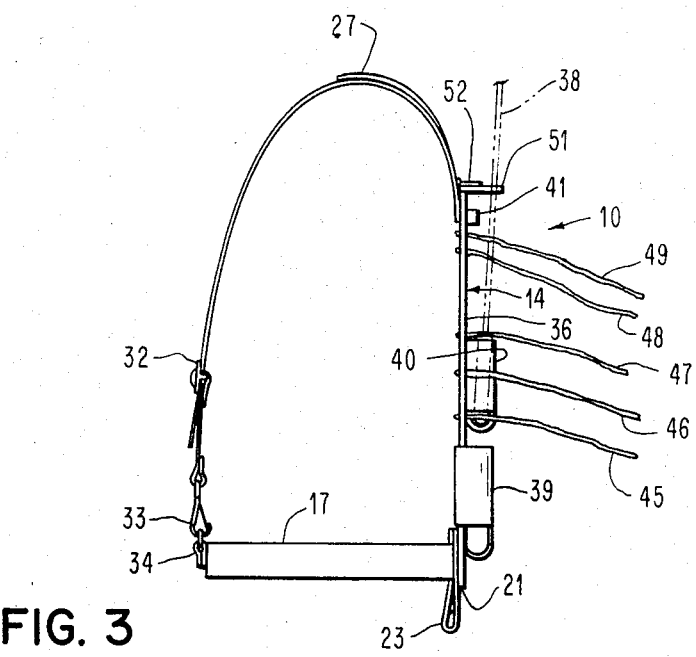
FIG. 3 is a side elevational view of the umbrella support of FIG. 1.

When the shaft support plate 51 is not in its shaft engaging position, it is disposed substantially vertical, as shown in FIG. 2, so that it is in the same plane as the support plate 14. The shaft support plate 51 rests against the body 12 (see FIG. 1) of the user in this non-engaging position.

Referring to FIG. 5, there is shown an umbrella support 55 for disposition on the back of the body 12 (see FIG. 1) of the user. The umbrella support 55 (see FIG. 5) includes a planar support plate 56, which is preferably formed of leather having a thickness of about ¼", having a leather belt 57 attached to its inner surface 58 (see FIG. 7), which bears against the back of the body 12 (see FIG. 1) of the user, adjacent its lower end 59 (see FIG. 7). The belt 57 passes through a leather loop 60, which is secured to the inner surface 58 of the support plate 56 by rivets 61. The belt 57 has a pair of snap receptacles 62 with one cooperating with a snap button 63 on the loop 60 to secure the belt 57 to the loop 60.

The inner surface 58 of the support plate 56 has a pair of leather straps 64 attached thereto by rivets 65 adjacent its upper end 66. Each of the straps 64 is connected by a buckle 67 to a short leather strap 68. Each of the short straps 68 is connected by a hook 69 on the end of the short strap 68 to a loop 70 (see FIG. 5) on the belt 57. The straps 64 pass over the shoulders of the user's body 12 (see FIG. 1) and cross over each other for attachment to the loops 70 (see FIG. 5) on the belt 57 at the front of the user's body 12 (see FIG. 1).

The angle of the support plate 56 (see FIG. 5) with respect to the user's body 12 (see FIG. 1) can be varied through positioning a plate 71 (see FIG. 5), which is pivotally mounted on the lower end 59 of the support plate 56 by a hinge 72, to different positions. The maximum angle of the support plate 56 to the user's body 12 (see FIG. 1) is when the plate 71 (see FIG. 6), which is preferably formed of leather, is disposed in a horizontal position.

The plate 71 is retained in any position to which it is adjusted through a leather strap 73, which is attached to the plate 71 by a rivet 74 (see FIG. 7), cooperating with a buckle 75 on a leather strap 76. The strap 76 is secured by a rivet 77 to the inner surface 58 of the support plate 56.

The support plate 56 has the first lower pocket 35 (see FIG. 5) mounted on its outer surface 78, which is the rear surface when the support plate 56 is mounted on the back of the body 12 (see FIG. 1) of the user. The second lower pocket 39 is not used. The support plate 56 (see FIG. 5) has the upper pocket 40 mounted thereon in vertically spaced relation to the lower pocket 35 in the same manner as the pockets 35 and 40 are mounted on the support plate 14 (see FIG. 1) of the umbrella support 10.

The support plate 56 (see FIG. 5) has the guide blocks 41 mounted thereon adjacent the upper end 66 of the support plate 56. It is not necessary for the support plate 56 to have the inclined edge 15 (see FIG. 1) since it fits on the back of the body 12 of the user so that the support plate 56 (see FIG. 5) is substantially rectangular shaped.

The support plate 56 has the leather strips 45, 47, and 49 employed therewith but does not use the leather strips 46 (see FIG. 1) and 48 for securing the umbrella shaft 38 to the support plate 56 (see FIG. 5).

The support plate 56 also has the shaft support plate 51 pivotally mounted thereon. Thus, the shaft support plate 51 functions in the same manner as it does for the support plate 14 (see FIG. 1). Accordingly, the umbrella support 55 (see FIG. 5) can support the umbrella shaft 38 (see FIG. 1) at various angles depending on whether the shaft support plate 51 (see FIG. 5) is in the shaft engaging position so that the umbrella shaft 38 (see FIG. 1) passes through one of the slots 53 (see FIG. 5) in the shaft support plate 51 or the shaft support plate 51 is in its non-engaging position so that the umbrella support shaft 38 (see FIG. 1) passes through one of the guide passages 42.

While the umbrella support 10 and the umbrella support 55 (see FIG. 5) have been shown and described as having the various elements formed of leather, it should be understood that such is not necessary for satisfactory operation. However, leather provides a very light-weight and comfortable structure.

An advantage of this invention is that an umbrella may be positioned and retained at any selected position. Another advantage of this invention is that it allows the hands of a user to be free to perform other functions. A further advantage of this invention is that it prevents a user from becoming tired from holding an umbrella. Still another advantage of this invention is that no modification is required of any umbrella shaft for use with the umbrella support. A still further advantage of this invention is that no mechanism is required so as to be subjected to breakage or rusting. Yet another advantage of this invention is that it is relatively lightweight. A yet further advantage of this invention is that it is comfortable.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:

1. An umbrella support for holding an umbrella at a selected position irrespective of whether the umbrella has a short or long shaft and a curved or straight handle including:

support means for disposition on a user's body;
   means to retain said support means on the user's body at a selected position;
   said support means having first receiving means and second receiving means fixedly mounted thereon in vertically spaced relation to each other, said first receiving means being disposed beneath said second receiving means and receiving a handle of a relatively long umbrella shaft of an umbrella to be supported thereby, and said second receiving means receiving a handle of a relatively short shaft of an umbrella to be supported thereby, each of said first receiving means and said second receiving means receiving either a curved handle or a straight handle;
   at least said second receiving means being formed of a non-rigid material so that said second receiving means does not block insertion of a handle of an umbrella shaft into said first receiving means;
   a plurality of non-movable shaft guide means mounted on said support means above said second receiving means to receive a portion of the umbrella shaft having its handle supported by one of said first receiving means and said second receiving means;
   each of said shaft guide means including means to hold a portion of the umbrella shaft therein;
   said shaft guide means being spaced from each other in a substantially horizontal direction so that each of said shaft guide means provides a different angle to the umbrella shaft supported on said support means;

and securing means on said support means to secure to said support means a portion of the umbrella shaft extending from one of said first receiving means and said second receiving means, said securing means being separate from said shaft guide means and securing the portion of the umbrella shaft independently of said shaft guide means.

2. The umbrella support according to claim 1 in which each of said first receiving means and said second receiving means includes a pocket having a sufficient width and depth to receive a curved handle of an umbrella shaft therein for support thereby in addition to a straight handle.

3. The umbrella support according to claim 2 in which said plurality of said shaft guide means comprises:

a plurality of spaced members mounted adjacent the upper end of said support means in substantially horizontally spaced relation to form substantially vertical passages therebetween to receive a portion of an umbrella shaft;

and each of said spaced members having its surface forming a wall of one of said substantially vertical passages inclined from its outer end to said support means to form said holding means for the portion of the umbrella shaft disposed therein.

4. The umbrella support according to claim 3 including:

movable means supported by said support means above said shaft guide means and movable between a position to engage a portion of an umbrella shaft disposed in one of said first receiving means and said second receiving means and a position to not engage a portion of the umbrella shaft;

said movable means in its umbrella shaft engaging position preventing the umbrella shaft from entering any of said vertical passages forming said shaft guide means and disposing the umbrella shaft at an angle to said support means so that the umbrella shaft has its upper portion further from said support means than its lower portion;

and said movable means including means to hold a portion of the umbrella shaft in said movable means.

5. The umbrella support according to claim 1 in which said plurality of said shaft guide means comprises:

a plurality of spaced members mounted adjacent the upper end of said support means in substantially horizontally spaced relation to form substantially vertical passages therebetween to receive a portion of an umbrella shaft;

and each of said spaced members having its surface forming a wall of one of said substantially vertical passages inclined from its outer end to said support means to form said holding means for the portion of the umbrella shaft disposed therein.

6. The umbrella shaft according to claim 5 including:

movable means supported by said support means above said shaft guide means and movable between a position to engage a portion of an umbrella shaft disposed in one of said first receiving means and said second receiving means and a position to not engage a portion of the umbrella shaft;

said movable means in its umbrella shaft engaging position preventing the umbrella shaft from entering any of said vertical passages forming said shaft guide means and disposing the umbrella shaft at an angle to said support means so that the umbrella shaft has its upper portion further from said support means than its lower portion;

and said movable means including means to hold a portion of the umbrella shaft in said movable means.

7. The umbrella support according to claim 1 including:

movable means supported by said support means above said shaft guide means and movable between a position to engage a portion of an umbrella shaft disposed in one of said first receiving means and said second receiving means and a position to not engage a portion of the umbrella shaft;

said movable means in its umbrella shaft engaging position preventing the umbrella shaft from entering any of said vertical passages forming said shaft guide means and disposing the umbrella shaft at an angle to said support means so that the umbrella shaft has its upper portion further from said support means than its lower portion;

and said movable means including means to hold a portion of the umbrella shaft in said movable means.

8. The umbrella support according to claim 1 in which said securing means includes separate means disposed above each of said first receiving means and said second receiving means and beneath each of said shaft guide means.

9. The umbrella support according to claim 1 including positioning means to position said support means at various angles on the user's body.

10. The umbrella support according to claim 9 in which said positioning means includes means pivotally connected to the lower end of said support means to be disposed at various angles to said support means for engagement against the user's body.

11. An umbrella support for holding an umbrella at a selected position irrespective of whether the umbrella has a short or long shaft and a curved or straight handle including:

support means for disposition on a user's body;

means to retain said support means on the user's body at a selected position;

said support means having first receiving means and second receiving means mounted thereon in vertically spaced relation to each other, said first receiving means being disposed beneath said second receiving means and receiving a handle of a relatively long umbrella shaft of an umbrella to be supported thereby, and said second receiving means receiving a handle of a relatively short shaft of an umbrella to be supported thereby, each of said first receiving means and said second receiving means receiving either a curved handle or a straight handle;

a plurality of shaft guide means mounted on said support means above said second receiving means to receive a portion of the umbrella shaft having its handle supported by one of said first receiving means and said second receiving means;

each of said shaft guide means including means to hold a portion of the umbrella shaft therein;

said shaft guide means being spaced from each other in a substantially horizontal direction so that each of said shaft guide means provides a different angle to the umbrella shaft supported on said support means;

securing means on said support means to secure to said support means a portion of the umbrella shaft extending from one of said first receiving means and said second receiving means;

movable means supported by said support means above said shaft guide means and movable between a position to engage a portion of an umbrella shaft disposed in one of said first receiving means and said second receiving means and a position to not engage a portion of the umbrella shaft;

said movable means in its umbrella shaft engaging position preventing the umbrella shaft from entering any of said shaft guide means and disposing the umbrella shaft at an angle to said support means;

said movable means including means to hold a portion of the umbrella shaft in said movable means;

and said movable means including:
  a plate pivotally mounted on said support means for movement between its umbrella shaft engaging and non-engaging positions;
  said plate having a plurality of slots extending therethrough, each of said slots being smaller at its outer end to form said holding means of said movable means;
  and said plate being disposed in a substantially horizontal position when in its umbrella shaft engaging position.

12. The umbrella support according to claim 11 including positioning means to position said support means at various angles on the user's body.

13. The umbrella support according to claim 12 in which said positioning means includes means pivotally connected to the lower end of said support means to be disposed at various angles to said support means for engagement against the user's body.

14. The umbrella support according to claim 13 in which said securing means includes separate means disposed above each of said first receiving means and said second receiving means and beneath each of said shaft guide means.

15. The umbrella support according to claim 11 in which said plurality of said shaft guide means comprises:
  a plurality of spaced members mounted adjacent the upper end of said support means in substantially horizontally spaced relation to form substantially vertical passages therebetween to receive a portion of an umbrella shaft;
  and each of said spaced members having its surface forming a wall of one of said substantially vertical passages inclined from its outer end to said support means to form said holding means for the portion of the umbrella shaft disposed therein.

16. The umbrella support according to claim 12 in which said plurality of said shaft guide means comprises:
  a plurality of spaced members mounted adjacent the upper end of said support means in substantially horizontally spaced relation to form substantially vertical passages therebetween to receive a portion of an umbrella shaft;
  and each of said spaced members having its surface forming a wall of one of said substantially vertical passages inclined from its outer end to said support means to form said holding means for the portion of the umbrella shaft disposed therein.

17. The umbrella support according to claim 13 in which said plurality of said shaft guide means comprises:
  a plurality of spaced members mounted adjacent the upper end of said said support means in substantially horizontally spaced relation to form substantially vertical passages therebetween to receive a portion of an umbrella shaft;
  and each of said spaced members having its surface forming a wall of one of said substantially vertical passages inclined from its outer end to said support means to form said housing means for the portion of the umbrella shaft disposed therein.

18. The umbrella support according to claim 14 in which said plurality of said shaft guide means comprises:
  a plurality of spaced members mounted adjacent the upper end of said support means in substantially horizontally spaced relation to form substantially vertical passages therebetween to receive a portion of an umbrella shaft;
  and each of said spaced members having its surface forming a wall of one of said substantially vertical passages inclined from its outer end to said support means to form said holding means for the portion of the umbrella shaft disposed therein.

19. The umbrella support according to claim 15 in which each of said first receiving means and said second receiving means includes a pocket having a sufficient width and depth to receive a curved handle of an umbrella shaft therein for support thereby in addition to a straight handle.

20. The umbrella support according to claim 16 in which each of said first receiving means and said second receiving means includes a pocket having a sufficient width and depth to receive a curved handle of an umbrella shaft therein for support thereby in addition to a straight handle.

21. The umbrella support according to claim 17 in which each of said first receiving means and said second receiving means includes a pocket having a sufficient width and depth to receive a curved handle of an umbrella shaft therein for support thereby in addition to a straight handle.

22. The umbrella support according to claim 18 in which each of said first receiving means and said second receiving means includes a pocket having a sufficient width and depth to receive a curved handle of an umbrella shaft therein for support thereby in addition to a straight handle.

* * * * *

UNITED STATES PATENT AND TRADEMARK OFFICE
CERTIFICATE OF CORRECTION

PATENT NO. : 4,537,339

DATED : August 27, 1985

INVENTOR(S) : Beverly Pearson

It is certified that error appears in the above-identified patent and that said Letters Patent is hereby corrected as shown below:

Column 6, line 22, "requircd" should read -- required --.

Column 10, line 20, "housing" should read -- holding --.

Signed and Sealed this

Third Day of December 1985

[SEAL]

Attest:

DONALD J. QUIGG

Attesting Officer

Commissioner of Patents and Trademarks